United States Patent

Miyoshi et al.

[11] 3,959,019
[45] May 25, 1976

[54] FUEL CELL

[75] Inventors: Noriomi Miyoshi; Yukimasa Tachibana, both of Kawasaki, Japan

[73] Assignee: Fuji Electric Co., Ltd., Kawasaki, Japan

[22] Filed: June 11, 1975

[21] Appl. No.: 585,894

Related U.S. Application Data

[62] Division of Ser. No. 456,993, April 1, 1974, abandoned.

[30] Foreign Application Priority Data

Mar. 30, 1973 Japan.............................. 48-36531

[52] U.S. Cl............................................ 136/86 R
[51] Int. Cl.²......................................... H01M 8/04
[58] Field of Search ............. 136/86 R, 86 B, 86 C, 136/159, 160

[56] References Cited
UNITED STATES PATENTS

| | | | |
|---|---|---|---|
| 2,921,110 | 1/1960 | Crowley et al...................... | 136/160 |
| 3,002,039 | 9/1961 | Bacon ................................. | 136/86 B |
| 3,238,070 | 3/1966 | Porter................................. | 136/160 |
| 3,287,167 | 11/1966 | Weiss et al......................... | 136/86 C |
| 3,462,308 | 8/1969 | Winters.............................. | 136/86 B |
| 3,525,641 | 8/1970 | Thorsheim ........................ | 136/86 B |

*Primary Examiner*—John H. Mack
*Assistant Examiner*—H. A. Feeley
*Attorney, Agent, or Firm*—Sughrue, Rothwell, Mion, Zinn & Macpeak

[57] ABSTRACT

In a fuel cell comprising (1) a generator cell having a fuel gas (hydrogen gas) chamber, an oxidizing gas (oxygen gas) chamber and an electrolyzing solution chamber (2), a fuel gas circulating circuit for supplying fuel gas to the fuel gas chamber of said generator cell, (3) an oxidizing gas circulating circuit for supplying oxidizing gas to the oxidizing gas chamber of said generator cell, and (4) an electrolyte circulating circuit for supplying an electrolytic solution to said electrolyzing chamber, the improvement characterized in that a means for regulating the concentration of the electrolytic solution at a constant value is provided on said electrolyzing chamber and a means for removing the formed water from each of said gas chambers, a means for regulating simultaneously the gas pressures in both of said gas chambers, and a means for keeping constant the temperature of said electrolytic solution are provided on each of said gas chambers.

2 Claims, 10 Drawing Figures

FUEL CELL

This is a division of application Ser. No. 456,993, filed Apr. 1, 1974 now abandoned.

BACKGROUND OF THE INVENTION

1. FIELD OF THE INVENTION

This invention relates to a fuel cell, e.g., a hydrogen-oxygen type fuel cell, comprising (1) a generator cell having a fuel gas chamber, an oxidizing gas chamber and an electrolyzing solution chamber, and (2) fuel gas and oxidizing gas circulating circuits for supplying the fuel gas and the oxidizing gas to the fuel gas chamber and to the oxidizing gas of said generator cell.

2. PRIOR ART

One of the problems as to the fuel cell is to provide a system capable of removing the formed water from the generator cell during the generating operation and discharging the removed water out of the fuel cell. It is the usual practice to remove the formed water from the interior of the generator cell by taking out the formed water in the form of steam using the carrier gas from the gas chamber side of each electrode face.

Another problem is a necessity to keep constant the concentration of the electrolytic solution irrespective of the change of the operating conditions, as the concentration of the electrolytic solution greatly influences the properties of the fuel cell. On the other hand, a porous gas diffusing electrode is used in the fuel cell, and it is necessary in order to operate the fuel cell stably for long period of time to keep the gas chamber side of the electrode always in the dried state. Accordingly, larger amounts of water larger than that of the formed water must be removed during the generating operation, but this results in the reduction of the amount of electrolytic solution, i.e., the increase of the concentration thereof. To solve this problem, such amounts of water as deducting that of water formed during the generating operation from that of water separated from the fuel cell by above described process, i.e., excess amounts of water deducted from the electrolytic solution, must be returned to the electrolytic solution, or clean water must be replenished to the electrolytic solution to keep constant the concentration thereof.

A further problem of the fuel cell is the necessity of balancing the pressure of hydrogen or oxygen gas with that of the electrolytic solution thereby to prevent the blowing of the gas into the electrolyzing solution chamber or inversely to prevent the penetration of the electrolytic solution into the gas chamber, for the purpose of keeping a three phase zone. If the pressure balance between the gas and the solution is destroyed, each gas blows through the gas chamber into the electrolyzing solution chamber, or the electrolytic solution penetrates through the electrolyzing solution chamber into the gas chamber, thus making it impossible to maintain the three phase zone.

A still further problem of the fuel cell is the necessity to keep constant the operation temperature of the fuel cell by removing the internal heat generation which is caused by the voltage drop due to the polarization potential of each electrode and the resistance of the electrolytic solution. One of the conventional temperature controlling methods is to flow intermittently cooling water by the operation of an electromagnetic valve. This method, however, is not favorable, since the amplitude of the temperature change becomes remarkable, and, moreover, the electromagnetic valve must be operated frequently to decrease the amplitude of the temperature change, thus shortening the life of the electromagnetic valve. Another method is to use a proportional valve such as is used in the ordinary plant, but proportional valves are not suitable as to shape, size and weight. Furthermore, both methods require electric operation, which consumes the electric power to reduce the total generating efficiency and requires a temperature detector, a relay, and an electric amplifier. Many of such electric instruments make intricate the structure of the fuel cell generating apparatus.

OBJECTS OF THE INVENTION

Therefore, an object of this invention is to arrange various members or instruments in a fuel cell not to accumulate the formed water or the leaked gas in the electrolyzing solution chamber.

Another object of this invention is to carry out both the discharge of the formed water and the return thereof to the electrolyzing system by making use of the pressure of hydrogen gas or oxygen gas without a pump or the like special means.

A further object of this invention is to keep the concentration of the electrolytic solution at an approximately constant value by detecting the concentration of the electrolytic solution as measuring the reduction of the amount thereof, and replenishing such amount of clean water as corresponding to the concentration or amount of the electrolytic solution to an electrolyzing solution tank.

A further object of this invention is to keep the temperature (operating temperature) of the electrolytic solution at an approximately constant value by absorbing continuously the internal heat generation in the fuel cell with the circulating electrolytic solution.

A still further object of this invention is to regulate both pressure of the hydrogen gas chamber and that of the oxygen gas chamber simultaneously with a single pressure controller to exhibit an equal value.

PREFERRED EMBODIMENTS OF THE INVENTION

Now, more particular embodiments of this invention will be described with reference to the accompanying drawings.

Figure 1:
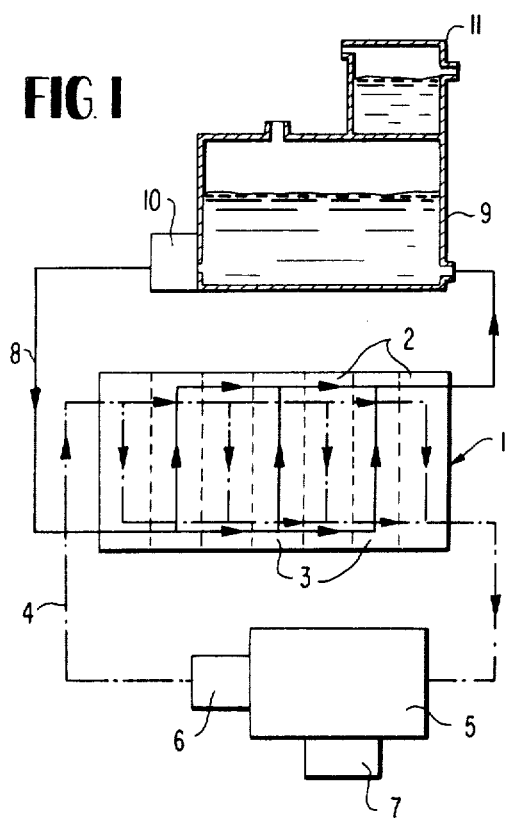
FIG. 1 is a schematic view of a fuel cell according to this invention.

Referring to the FIG. 1, pluralities of oxygen and hydrogen gas chambers 2 and pluralities of electrolyzing solution chambers 3 are provided in a generator cell 1. Oxygen and hydrogen electrodes (not shown) are also provided in the generator cell. A gas circulating circuit 4 supplies oxygen or hydrogen gas to either the oxygen or hydrogen gas chambers 2. Another gas circulating circuit (not shown) is arranged in parallel to said circuit 4 to supply whichever gas is not supplied by the shown circuit. Numeral 5 indicates a gas cooler of the gas circulating circuit 4 provided at the lower part of the generator cell 1, and numeral 6 indicates a gas circulating pump. The circulating gas is cooled in the gas cooler 5, introduced into the upper part of the generator cell 1 by the gas circulating pump 6, and passed through the generating cell 1 downwards to return to the gas cooler 5. Moisture formed in the generating cell 1 is carried by the circulating gas into the gas cooler 5, and condensed therein to drip in a formed water tank 7, which is arranged below the gas cooler 5.

An electrolytic solution circulating circuit 8 for supplying the electrolytic solution to the electrolyzing solution chamber 3 of the generator cell 1 is equipped with an electrolyzing solution tank 9 and an electrolytic solution circulating pump 10. The electrolyzing solution tank 9 is formed to have therein a free liquid surface. The electrolytic solution flows through the electrolyzing solution tank 9, the electrolyzing solution circulating pump 10, and the electrolyzing solution chamber 3 upwards. A clean water tank 11 is provided on the upper part of the electrolyzing solution tank 9, and the clean water is supplied to the electrolyzing solution tank 9 from time to time to control the concentration of the electrolytic solution therein.

In such a fuel cell, the gas leaked into the electrolyzing solution chamber of the generator cell 1 is carried by the electrolytic solution flowing through said chambers upwards into the electrolyzing solution tank 9, and it is easily separated and released from the electrolytic solution at the free liquid surface. As the direction of the rising gas agrees with that of the flowing electrolytic solution, the leaked gas is not retained in the generator cell 1 and in the way of the electrolyzing solution pipe between the generator cell 1 and the free liquid surface in the electrolyzing solution tank 9.

Besides, the circulating gas is forced to pass through the gas chambers 2 in the generator cell 1 downwards, and accordingly both the electrolytic solution penetrating into the gas chambers of the generator cell 1 and the moisture condensed in the neighbor of the gas outlet of the generator cell are not retained in the generator cell 1 and in the way of the gas pipe between the generator cell and the gas cooler 5, since the direction of the circulating gas flow is the same as that of the electrolytic solution flow or the moisture flow. The formed water contained as the vapor in the gas is condensed in the gas cooler 5, separated therein from the carrier gas, and dripped into the formed water tank 7.

Thus, the above described conditions for keeping always the three phase zone are satisfied by the structure of the fuel cell according to this invention.

Figure 2:
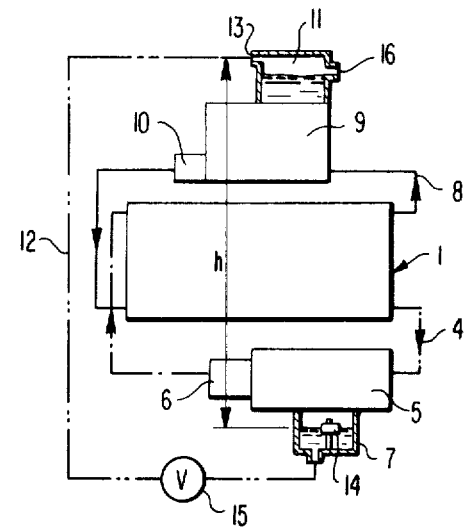
FIG. 2 is a schematic view of another fuel cell according to this invention.

Referring to the FIG. 2, the clean water tank 11 may be connected to the formed water tank 7 via a return pipe 12, whereby the formed water can be used as the water for regulating the concentration of the electrolytic solution. In such a case, the inner pressure of the gas cooler 5 or that of the gas circulating circuit 4 is set at such a value that the formed water rises from the tank 7 through the formed water return pipe 12 to the formed water return tank (clean water tank) 11 due to a difference between the pressure in the gas cooler 5 and the inner pressure of the clean water tank 11 (atmospheric pressure). That is to say, the pressure in the gas cooler 5 is set at a value $h$ mm Aq higher than the atmospheric pressure, assuming that a height between a liquid surface in the formed water tank 7 and a water inlet 13 of the formed water return tank 11 is $h$ mm.

Figure 4:
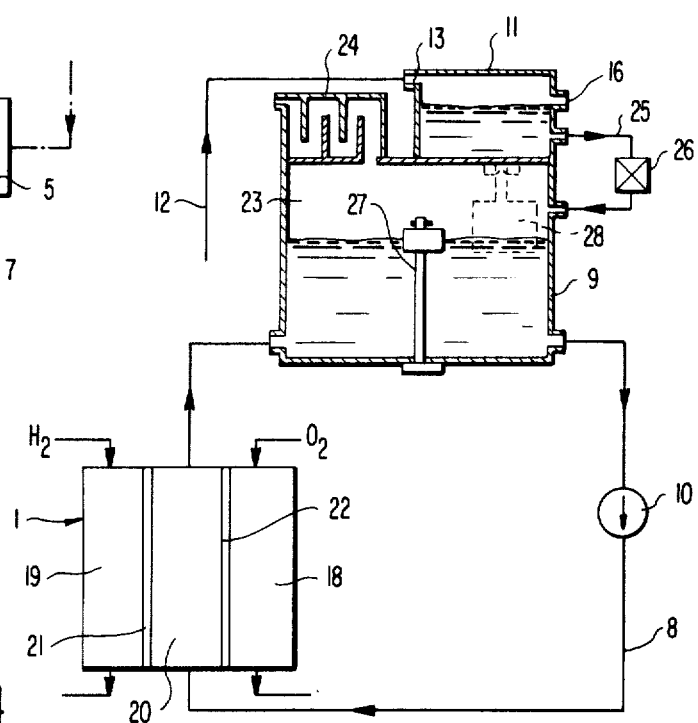
FIG. 4 is a schematic view of a controller for the concentration of the electrolytic solution.

Numeral 14 indicates a float switch operated "on" or "off" state in accordance with the liquid level in the formed water tank 7, and numeral 15 indicates an electromagnetic valve opened or closed by said float switch 14. In order to prevent the leakage of the gas in the gas cooler 5 into the formed water return tank 11, the electromagnetic valve 15 is set closed where the operating level of the float switch 14 is below a predetermined level, and the outlet of the formed water is provided at the lowest part of the formed water tank 8. Excess amount of formed water is discharged from an overflowing opening 16 provided on the formed water return tank 11. The formed water in the formed water return tank 11 is replenished into the electrolyzing solution tank 9 in accordance with the concentration and level of the electrolytic solution in the formed water return tank 11, as shown in FIG. 4 and further described hereinafter. In this embodiment, special conveying means other than gravity is not required to supply the formed water to the electrolyzing solution tank 9.

Figure 3:
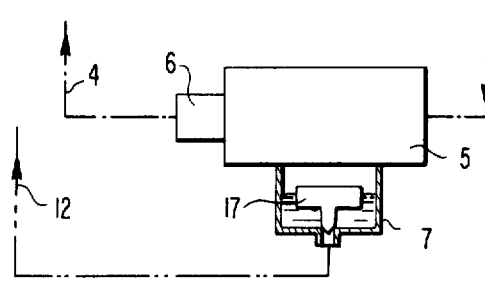
FIG. 3 is an enlarged cross section of a water tank in the fuel cell shown in FIG. 2.

In the example of the formed water tank 7 in the FIG. 2, the discharge of the formed water is regulated by both the float switch 14 and the electromagnetic valve 15, but a float valve 17 opening or closing according to the level in the formed water tank 7, as shown in the FIG. 3, can be used in lieu of the float switch 14 and the electromagnetic valve 15.

Thus, the formed water can be discharged by the difference between the pressure in the gas cooler and that in the formed water return tank, and on occasion, can be returned, as the replenishing water, to the electrolytic solution in accordance with said pressure difference. Accordingly, the formed water can be discharged or returned to the electrolytic solution without using any special means. Besides, the fuel cell according to this invention has the minimum movable parts and consumes the minimum energy by itself.

Referring to the FIG. 4, the concentration of the electrolytic solution can be easily regulated by replenishing the clean water thereto from the formed water return tank (clean water tank) 11 according to the level in the electrolyzing solution tank 9. The generator cell 1 is schematically shown in the FIG. 4, and comprises the oxygen gas chamber 18, the hydrogen gas chamber 19, the electrolyzing solution chamber 20, a hydrogen electrode 21 and an oxygen electrode 22. The electrolyzing solution tank 9 is filled with the electrolytic solution except for an air layer 23 which is communicated to the atmospheric air via a breezer 24.

Numeral 25 indicates a pipe for replenishing water from the clean water tank 11 to the electrolytic solution, and an electromagnetic valve 26 is provided in the way of the water replenishing pipe 25.

The electromagnetic valve 26 is actuated by a level switch 27 which is operated "on" or "off" state in accordance with the liquid level in the electrolyzing solution tank 9. That is to say, if the level in the electrolyzing solution tank 9 is lowered excessively, the electromagnetic valve 26 is opened to replenish water from the clean water tank 11 to the electrolyzing solution tank 9. Once the level in the electrolyzing solution tank 9 is restored to the desired level, the electromagnetic valve 26 is closed. In such a case, the clean water can be replenished by gravity by providing the clean water tank 11 on the electrolyzing solution tank 9.

As the concentration of the electrolytic solution is detected by the level in the electrolyzing solution tank 9, the detection work is very easy and the regulation of the concentration can be carried out only by replenishing the clean water to the electrolytic solution in accordance with the concentration. Besides, as gravity is made use of to replenish water in the electrolytic solution, special pump means and power source are not required. Further more, the formed water in the fuel cell can be used as the replenishing water, thus making the fuel cell compact and economical. In addition to that, the regulation of the concentration of the electrolytic solution can be carried out ever stably without influence of the ambient temperature and the contamination of the liquid.

The level switch and the electromagnetic valve 26 used for replenishing the clean water to the electrolytic solution can be replaced with a float valve 28 provided in the clean water tank 11, as shown by the dotted line, which opens or closes in accordance with the level in the electrolyzing solution tank 9. This structure makes the fuel cell more compact and eliminates the need for a power source for the operation of the electromagnetic valve.

Figure 5:
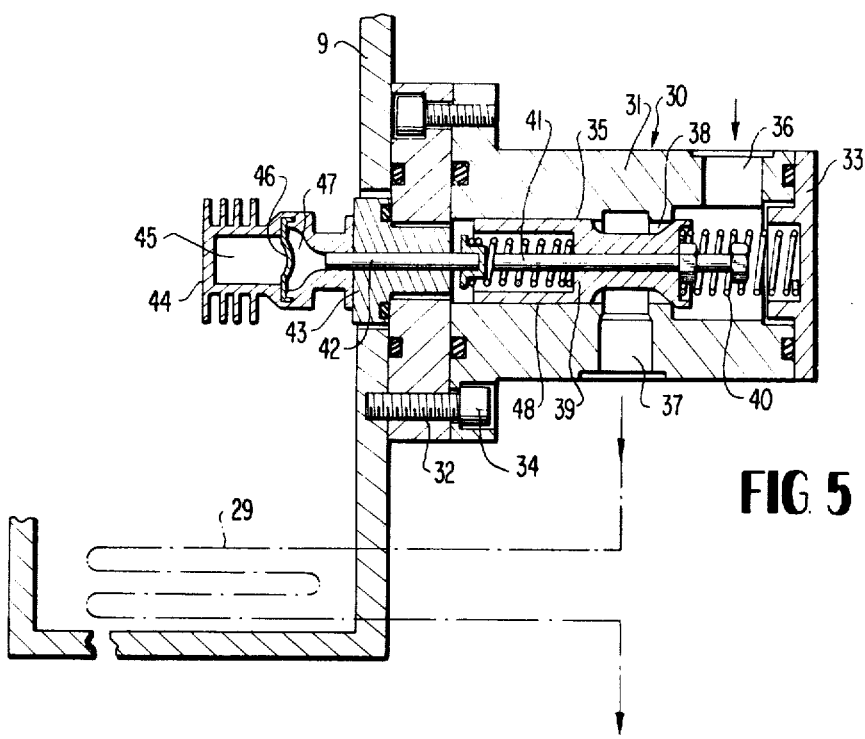
FIG. 5 is a cross section of a controller for the temperature of the electrolytic solution.

In order to remove continuously the internal heat generated in the fuel cell and to keep constant the temperature of the electrolytic solution, a water cooling pipe 29 is provided in the electrolyzing solution tank 9, as shown in the FIG. 5. A regulator valve means 30 is provided in the water cooling pipe 29 for regulating automatically the amount of the cooling water.

Figure 6:
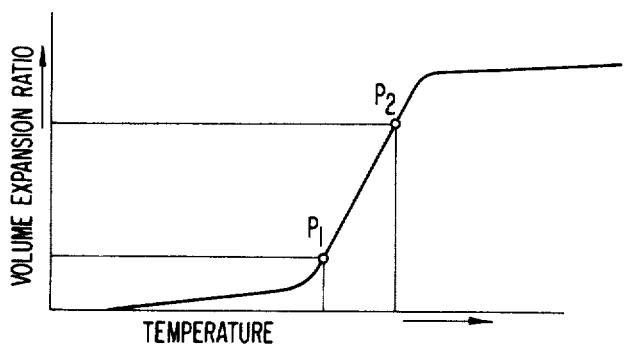
FIG. 6 is a characteristics curve of wax used in the temperature controller shown in the FIG. 5.

In the FIG. 5, a casing 31 for the regulator valve means 30 is formed as a hollow cylinder, a shielding plate 32 is fixed to one end thereof, and a cover plate 33 is attached to the other end. This casing 31 is attached to the electrolyzing solution tank 9 by a bolt 34. Both a cooling water inlet 36 and a cooling water outlet 37 are arranged at mutually different positions on a center hole 35 of the casing 31 and communication therewith. A valve 39 sliding axially on the center hole 35 and opening or closing an opening 38 between the cooling water inlet 36 and the cooling water outlet 37 is provided in the center hole 35. The valve 39 is biased towards the closing direction by a spring 40. Numeral 41 indicates a valve rod of the valve 39. A handling rod 42 for opening the valve 39 penetrates slidably through a bush 43 attached to the shielding plate 32. A heat sensitive body 44 for measuring the temperature of the electrolytic solution in the tank 9 is attached to the bush 43. The body 44 is composed of a chamber 45 containing wax having the volume expansion characteristics shown in the FIG. 6, a diaphragm 46 serving as one wall of said wax chamber 45, and a chamber 47 containing transmitting medium (grease) for transmitting the amplified operation of the diaphragm 46 to the operating rod 42. That is to say, one end of the operating rod 42 is confronted with the valve rod 41 and another end is confronted with the diaphragm 46 of the heat sensitive body 44.

Suitable sealing means is applied not to cause the leakage of the transmitting medium in the chamber 47 through an aperture between the operating rod 42 and the bush 43. A spring 48 having a repelling force smaller than that of the spring 40 biases the operating rod 42 away from the valve rod 41.

Both the shielding plate 32 and the bush 43 are made from heat insulating material so that the heat sensitive body 44 is not influenced by the cold water and atmospheric air. The valve rod 41 is screwed to the valve 39 to adjust the relative position to the latter and to regulate the temperature at the opened or closed state, i.e., the predetermined temperature of the electrolyzing solution.

Figure 7:
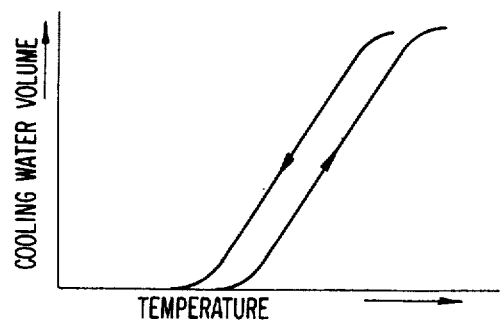
FIG. 7 is a graph showing a relation between the temperature of the electrolytic solution and amount of cooling water in the temperature controller shown in the FIG. 5.

The operation of the fuel cell thus formed will be described below. When the temperature of the electrolyzing solution is elevated by the internal heat generation of the electrolytic solution in the fuel cell 1, the wax in the chamber 45 of the heat sensitive body 44 expands in accordance with the volume expanding property as shown in the FIG. 6 to thrust the diaphragm 46. This motion of the diaphragm 46 decreases the axial cross section of the grease chamber 47 and the axial stroke is transmitted to the operating rod 42 as amplified. The operating rod 42 is actuated against the repelling force of the spring 48 to contact the valve rod 41, and the valve rod 41 opens the spring 39 against the repelling force of the valve 40. Thus, the cooling water is passed through the cooling water pipe 29 as shown in the FIG. 7, to cool continuously the electrolytic solution. If the temperature of the electrolytic solution is lowered below the predetermined temperature, the valve 39 is closed to stop the supply of the cooling water to the cooling water pipe 29. On the other hand, if the temperature of the electrolytic solution is elevated above the predetermined temperature, the valve 39 is opened with the suitable opening degree to supply the necessary amount of cooling water.

As described above, amount of the cooling water supply to an electrolytic solution heat exchanger can be regulated proportionally according to this invention, thus the temperature of the electrolytic solution can be kept constant exactly. This electrolytic solution temperature controller does not require any electric accessories such as an electromagnetic valve, so that the consumption of the electric power is not caused to decrease the generating efficiency of the fuel cell and the structure of the fuel cell is made simplified and compact to reduce the total weight. Besides, the temperature control is easily carried out.

Figure 8:
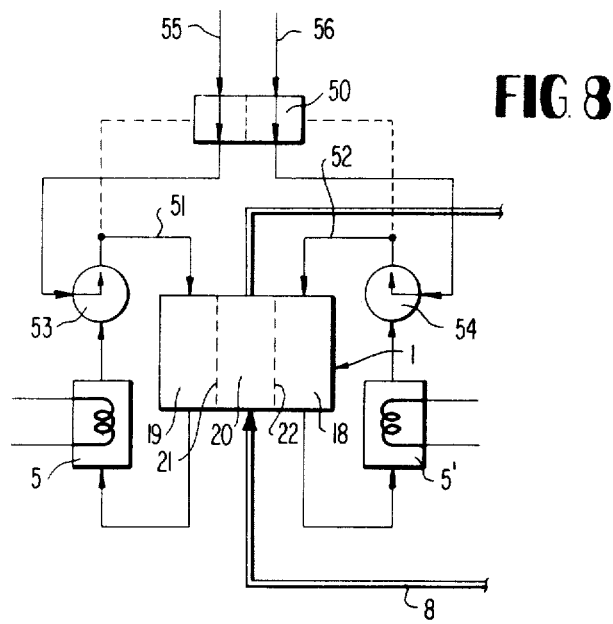
FIG. 8 is a systematic view of a fuel cell having the pressure regulating means according to this invention.

The FIG. 8 shows a schematic view of the fuel cell provided with a pressure controller means 50 in order to keep a balance between the hydrogen or oxygen gas pressure and the electrolytic solution pressure. In the FIG. 8, the fuel cell 1 is shown as composed of the oxygen gas chamber 18, the hydrogen gas chamber 19, the electrolyzing solution chamber 20, the hydrogen electrode 21, and the oxygen electrode 22. A hydrogen gas consuming system 51 and an oxygen gas circulating system 52 are arranged mutually symmetrically. The high pressure hydrogen and oxygen gasses are reduced by a pressure controller means 50 hereinafter described, supplied to the gas chambers 18 and 19 of the generating cell via ejectors 53 and 54, and consumed therein in amount corresponding to the electric power generated. In such a case, both the pressure in the oxygen gas chamber 18 and that in the hydrogen gas chamber 19 are required to be kept at the constant and equal value corresponding to the electric power generated. The pressure controlling means 50 is formed to satisfy such requirements as shown in the FIG. 9 and FIG. 10.

Figure 9:
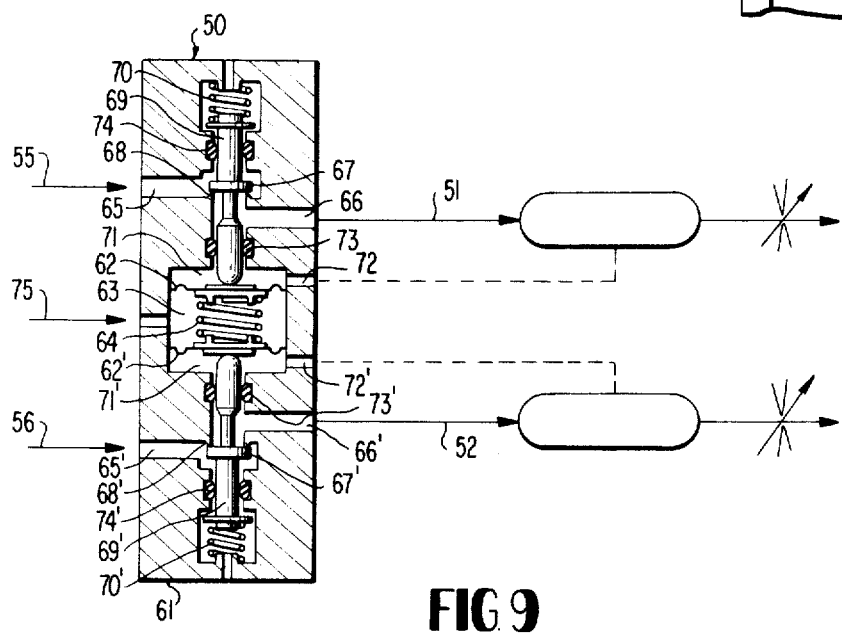
FIG. 9 is a longitudinal cross section of the pressure controller means shown in the FIG. 8.

In the FIG. 9, numerals 51 and 52 indicate the hydrogen gas consuming system and oxygen gas consuming system, respectively, and numerals 55 and 56 indicate the hydrogen gas supplying system and the oxygen gas supplying system, respectively. The pressure controlling means 50 is provided between both said gas consuming systems 51 and 52 and both said gas supplying system 55 and 56, and constructed to control simultaneously both pressures. That is to say, a pressure controlling spring chamber 63 formed by a pair of diaphragm 62 and 62' is provided on a middle part of a hollow casing 61, and a pressure controlling spring 64 is contained in said chamber 63. A pair of pressure controlling valve mechanisms for the gas consuming systems 51 and 52 is symmetrically provided at both sides of the pressure controlling spring chamber 63.

One of the pressure controlling valve mechanisms will be described. Numeral 65 indicates a gas inlet connected to the gas supplying system 55, and numeral 66 indicates a gas outlet connected to the gas consuming system 51. A valve 67 opens or closes an outlet opening 68 which communicates with the gas inlet 65 and the gas outlet 66. The valve 67 is attached on a valve rod 69 which is always in contact with the diaphragm 62, and it is biased towards the valve seat of the outlet opening 68 by a sealing spring 70. A pair of pressure feed back chambers 71, 71' is provided at both sides of the pressure controlling spring chamber 63, and the pressure of the gas consuming system 51 is communicated with the feed back chambers 71 via openings 72. An O ring 73 seals between the gas outlet 66 and the pressure feed back chamber 71, and an O-ring 74 seals the gas inlet 65 from the atmosphere. Another pressure controlling valve mechanism for the other gas flowing systems 52 and 56 is constructed in the same manner; and "dash" marks are applied on each corresponding member of the pressure controlling valve mechanism for the gas systems 51 and 55. Numeral 75 indicates hole for introducing atmospheric pressure or other suitable pressure to the pressure controlling spring chamber 63.

The pressure controlling valve means 50 thus formed is operated as described below. Gasses supplied from the gas supplying systems 55 and 56 flow through the gas inlets 65, 65', respectively, into the casing 61, and, where the valves 67, 67' are opened, are supplied through the opening 68' and the gas outlets 66, 66' to the gas consuming systems 51, 52 respectively. The pressure in the gas consumming systems 51 and 52 change with the gas supplying amounts, but are introduced into the pressure feed back chambers 71 and 71' and controlled therein in a manner hereinafter described.

Neglecting the friction forces of the O-ring 73, 74, 73', 74' and diaphragm 62, 62', as the diameter of the O-ring 73 or 74 is equal to that of the O-ring 73' or 74' to offset the thrust of the gas supplying side with that of the gas consuming side, the force compressing the valve rod 69, 69' into the sealing spring 70, 70' is the sum of a force caused by multiplying the inner pressure of the pressure controlling spring chamber 63 by the effective area of the diaphragms 62, 62' and a repelling force of the pressure controlling spring 64. On the other hand, the inverse force is the sum of a force caused by multiplying the inner pressure of the pressure feed back chamber 71, 71' by the effective area of the openings 72, 72' and repelling forces of the sealing springs 70, 70'. The difference between both said forces serves as a force to thrust the valve rod 69 towards the sealing spring 70, i.e., a force to open the valve 67. Accordingly, the pressure in the gas consumming system is determined by the force which actuates the valve rod, or the repelling force of the pressure controlling spring 64. According to the pressure controlling mechanism of this invention, a pair of pressure controlling means, each having the same size and structure, is arranged symmetrically but mutually united, and a single pressure controlling spring means is used to actuate automatically the repelling force to the diaphragms of both gas supplying and consuming systems. Besides, the pressures in two gas consuming systems are controlled to show the equal value by the pressure controlling mechanism without using other special means.

Figure 10:
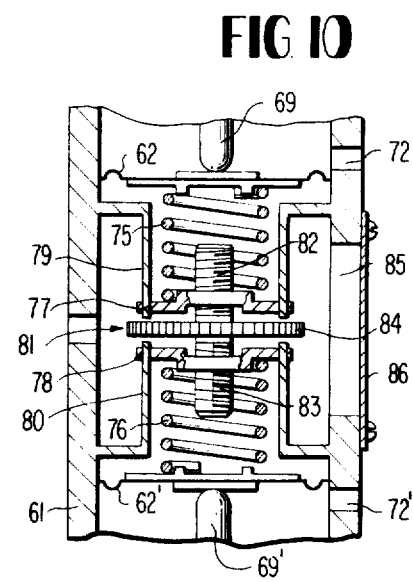
FIG. 10 is a partly enlarged cross section of another pressure controller means shown in the FIG. 8.

In order to make controllable the pressure range of the gas consuming system, the repelling force of the pressure controlling spring may be made variable, as shown in the FIG. 10.

The FIG. 10 shows a structure of the pressure controlling spring chamber 63 in the FIG. 9, in which a means for adjusting the preset pressure by changing the compressed length of the spring is provided. The repelling force of the spring will be changed in accordance with the compressed length of the spring. The pressure controlling spring in this example is composed of two springs 75 and 76, the former of which is provided between the diaphragm 62 and the spring seat 77 and the latter of which is provided between the other diaphragm 62 and the spring seat 78. Each of said spring seats 77, 78 is supported so as to move axially along a pair of guide pins 79, 80, respectively. A repelling force adjusting means 81 comprises a bolt 82 screwed into the spring seat 77, a bolt 83 the hand of the thread of which is the reverse of the hand of the thread on bolt 82 screwed into the spring seat 78, and a flange like dial 84 fixedly connected to the bolts 82, 83 at the middle part. A handling opening 85, usually closed by the lid 86, is provided on the casing 61. The guide pins 79, 80 are attached to the valve casing 61.

When the repelling forces of the pressure controlling spring 75, 76 are required to be changed, the handling dial 84 will be rotated to shift the spring seats 77, 78 axially and relatively as the rotation of the rod spring seats is prevented by the guide pins 79, 80. Because the threads on the bolts 82 and 83 are of opposite hand, the spring seats 77, 78 move in opposite directions when the handling dial 84 is turned. Thus, the repelling forces of the pressure controlling springs 75, 76 can be changed.

As particularly described above, according to the single pressure adjusting valve means of this invention, the pressures of the hydrogen gas and oxygen gas systems can be adjusted to an equal value, and also set easily and simultaneously to the desired value.

While this invention has been described with reference to particular embodiments thereof, it will be understood that the numerous modifications may be made by those skilled in the art without actually departing from the scope of the invention.

Therefore, the appended claims are intended to cover all such equivalent variations as coming within the true spirit and scope of the invention.

What is claimed is:

1. In a fuel cell comprising:
    1. a generator cell having a fuel gas chamber, an oxidizing gas chamber, and an electrolyzing solution chamber;
    2. a fuel gas circulating circuit for supplying fuel gas to the fuel gas chamber of said generator cell;
    3. an oxidizing gas circulating circuit for supplying oxidizing gas to the oxidizing gas chamber of said generator cell;
    4. an electrolyte circulating circuit for supplying an electrolytic solution to the electrolyzing solution chamber of said generator cell;
    5. a gas cooler located in said fuel gas circulating circuit beneath said generator cell;
    6. a formed water tank located beneath said gas cooler and in fluid communication therewith, whereby moisture formed in said generating cell, carried by said fuel gas into said gas cooler, and condensed therein will drip by force of gravity into said formed water tank;
    7. an electrolyzing solution tank located in said electrolyte circulating circuit above said generator cell; and
    8. a clean water tank located above said electrolyzing solution tank and in fluid communication therewith, whereby clean water can be supplied by force of gravity from time to time to said electrolyzing solution tank from said clean water tank in order to control the concentration of the electrolytic solution therein, whereby gas leaked into the electrolyzing solution chamber of said generator cell is carried by the electrolytic solution flowing through said electrolyte circulating circuit upwards into said electrolyzing solution tank, where it is easily separated from the electrolytic solution, and electrolytic solution leaked into the fuel gas chamber of said generator cell is carried by the fuel gas flowing through said fuel gas circulating circuit downwards into said gas cooler, where it is separated from the fuel gas and dripped into said formed water tank, the improvement comprising means for keeping the fuel gas pressure in the fuel gas chamber of said generator cell and the oxidizing gas pressure in the oxidizing gas chamber of said generator cell constant and equal.

2. A fuel cell as claimed in claim 1 wherein said means for keeping the fuel gas pressure in the fuel gas chamber of said generator cell and the oxidizing gas pressure in the oxidizing gas chamber of said generator cell constant and equal comprise:
    a. a first diaphragm forming a portion of the wall of said fuel gas chamber;
    b. a second diaphragm forming a portion of the wall of said oxidizing gas chamber;
    c. a first compression spring having a first end thereof bearing against said first diaphragm;
    d. a second compression spring having a first end thereof bearing against said second diaphragm, said second compression spring being coaxial with said first compression spring;
    e. a first spring seat bearing against the second end of said first compression spring;
    f. a second spring seat bearing against the second end of said second compression spring;
    g. means for allowing said first and second spring seats to translate towards and away from said first and second diaphrams but preventing said first and second spring seats from rotating about the axis of said first and second compression springs; and
    h. an adjusting means comprising a first bolt threadedly mounted in said first spring seat and a second bolt threadedly mounted in said second spring seat, the hands of the threads on said first and second bolts being opposite, whereby when said adjusting means is rotated in one direction, said first and second spring seats are moved towards said fuel gas chamber and said oxidizing gas chamber, respectively, and, when said adjusting means is rotated in the opposite direction, said first and second spring seats are moved away from said fuel gas chamber and said oxidizing gas chamber, respectively.

* * * * *